I. Davis,
Horse-Collar Machine.
No 6850
Reissued Jan. 11, 1876
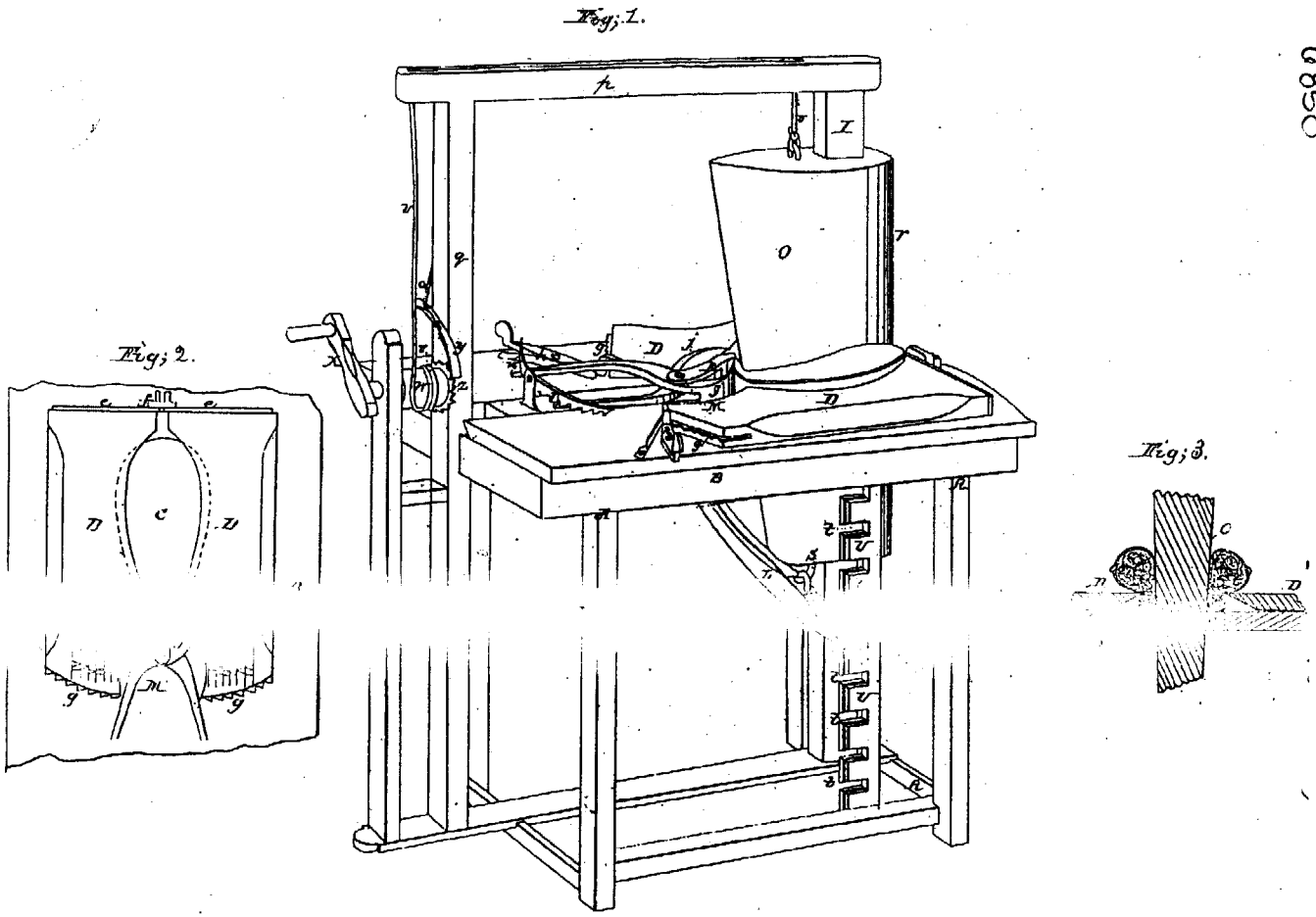
K. PETERS, PHOTO-LITHOGRAPHER, WASH.

UNITED STATES PATENT OFFICE.

HOMER LEE, OF NEW YORK, N. Y.

IMPROVEMENT IN DESIGN FOR A COMBINED INKSTAND AND PAPER-WEIGHT.

Specification forming part of Design No. 8,482, dated July 13, 1875; reissue No. 6,850, dated January 11, 1876; application filed January 4, 1876.

*To all whom it may concern:*

Be it known that I, HOMER LEE, of the city, county, and State of New York, have invented or produced a new and original Design for Combined Ink-Bottle and Paper-Weight; and I do hereby declare the following to be a full, clear, and exact description of the same, reference being had to the accompanying photographic illustration making part of this specification.

In the said illustration a perspective view is shown of an ink-bottle and paper-weight, having the general contour of a bell. Near the lower edge are beads or ribs E, from which the base swells in a curve until it meets beads or ribs F, from these latter it recedes until it meets the body A of a slightly conical form. Near the top are beads or ribs G, H, and I. The top is rounded off, and at or near the center formed with a series of ears or projections, K, in imitation of those by means of which a bell is usually hung. On one side is a groove, D, made in imitation of a crack in a bell. The ribs or beads G H I extend entirely around the ink-bottle and paper-weight, while the ribs or beads E F encircle the same, but their continuity is broken by the groove D. In the spaces between the ribs or beads G H I the letters, numerals, and other characteristics of the old Liberty Bell may be placed.

When the combined ink-bottles and paper-weights are made of glass, pictures may be placed in their middle portion; but this forms no part of my design. A pin-cushion is placed upon the projections or ears K.

The chief characteristics of my design for a combined ink-bottle and paper-weight are that it shall have the general contour of a bell, be formed with beads or ribs, a groove on one side, and the top made with ears or projections.

Having thus fully described my design, what I claim as new, and desire to secure by Letters Patent, is—

1. A design for a combined ink-bottle and paper-weight, consisting, essentially, of a representation of a bell, having a groove and ribs, substantially as shown and described.

2. A design for a combined ink-bottle and paper-weight, consisting of a representation of a bell, having a groove, D, ribs or beads E F G H I, and ears K, substantially as shown and described.

3. A design for a combined ink-bottle and paper-weight, consisting of a representation of a bell, having a groove, D, ribs or beads E F G H I, and ears F, the whole being surmounted with a pin-cushion spherical in form.

In testimony whereof I have signed my name to this specification in the presence of two subscribing witnesses.

HOMER LEE.

Witnesses:

H. T. MUNSON,

M. B. PHILIPP.